Aug. 18, 1936.                P. BARKER                 2,051,463
                        METALLURGICAL FURNACE
                        Filed Dec. 19, 1933           4 Sheets-Sheet 1

INVENTOR
Pierce Barker
BY
ATTORNEYS

Aug. 18, 1936.                P. BARKER                2,051,463
                        METALLURGICAL FURNACE
                         Filed Dec. 19, 1933           4 Sheets-Sheet 2

INVENTOR
Pierce Barker
BY
Austin Fox
ATTORNEYS

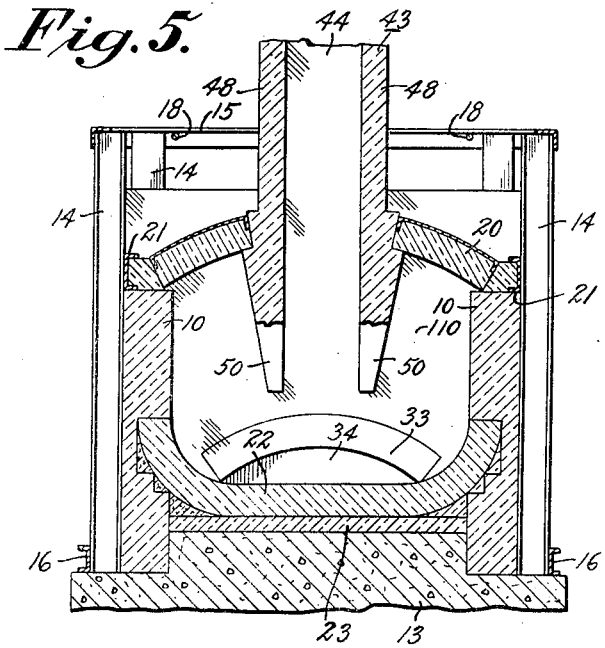
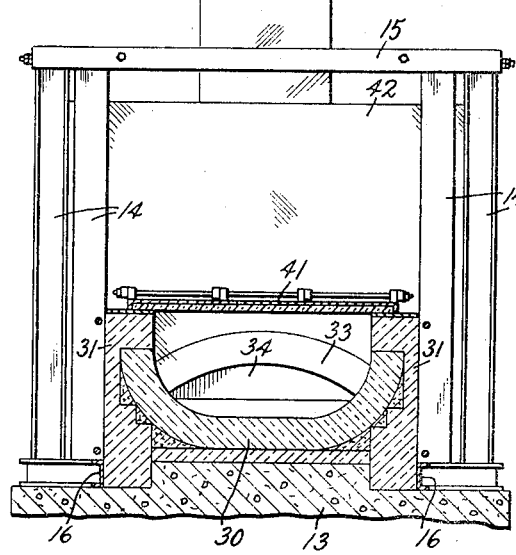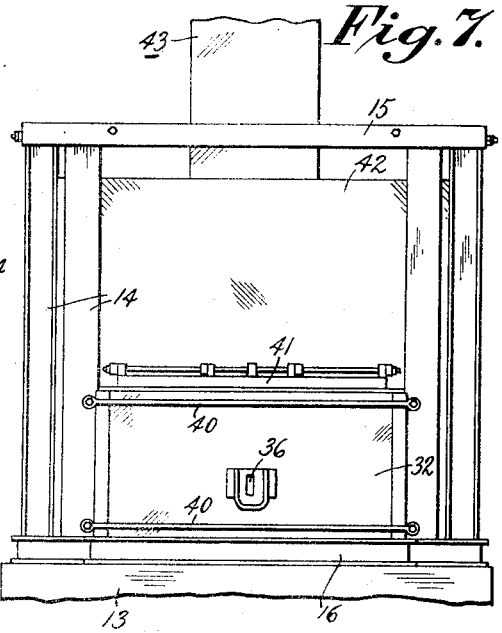

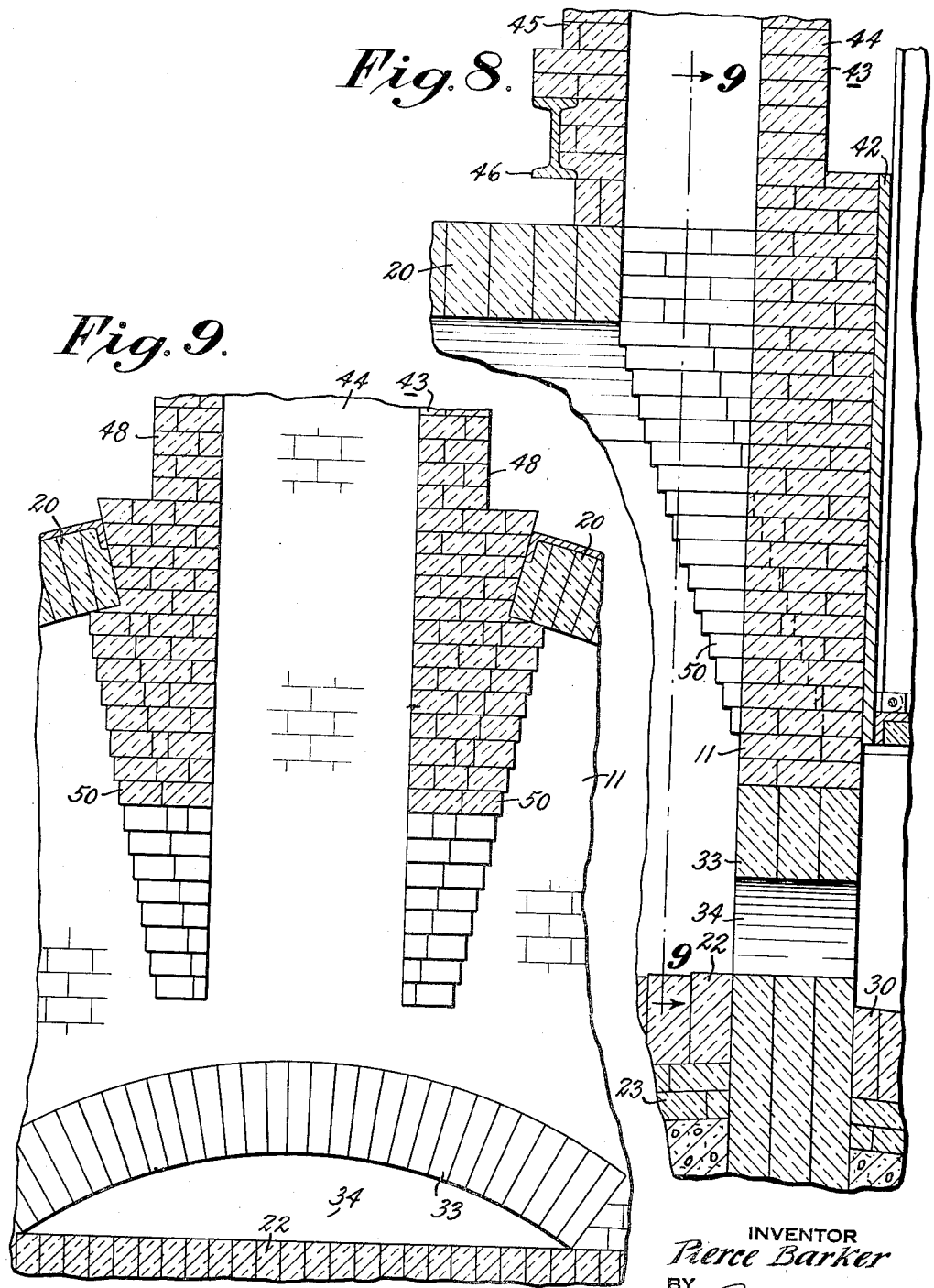

Patented Aug. 18, 1936

2,051,463

UNITED STATES PATENT OFFICE 2,051,463

METALLURGICAL FURNACE

Pierce Barker, Highland Park, Mich., assignor to Federated Metals Corporation, New York, N. Y., a corporation of Delaware Application December 19, 1933, Serial No. 703,033

5 Claims. (Cl. 266—40)

This invention relates to metallurgical furnaces and more particularly to a furnace having means for introducing into a furnace metals which are readily affected by the atmosphere of the furnace.

In one embodiment, the invention may be applied to a furnace for the remelting and refining of scrap to recover the metal therefrom. The scrap may be of various forms and sizes, some of which may be more readily oxidized than others. The present invention provides a furnace structure having means to receive and melt a main charge and having means whereby the smaller particles may be introduced into the bath without coming into contact with the atmosphere of the furnace. As a specific example, the furnace may be used for the recovery of aluminum from relatively large scrap such as crankcases and also from relatively small scrap such as aluminum turnings, borings, chips, washings, skimmings, shavings, dross, and the like.

The invention provides in general a forehearth outside of the main furnace walls and in communication with the main bath so that a bath of molten metal is maintained thereon. The readily oxidizable material is introduced into the bath on the forehearth without coming in contact with the atmosphere of the furnace and is melted by the heat of the bath.

The invention also consists in certain novel features of construction and details of operation which will be apparent as the nature thereof is more fully disclosed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a side elevation of a furnace embodying this invention;

Fig. 5 is a transverse section taken on the line 5—5 of Fig. 4 showing the flue construction;

Fig. 6 is a section of the forehearth taken on the line 6—6 of Fig. 4;

Fig. 7 is a front elevation of the furnace;

Fig. 8 is an enlarged detail of the flue; and

Fig. 9 is a section taken on the line 9—9 of Fig. 8.

Figure 1:
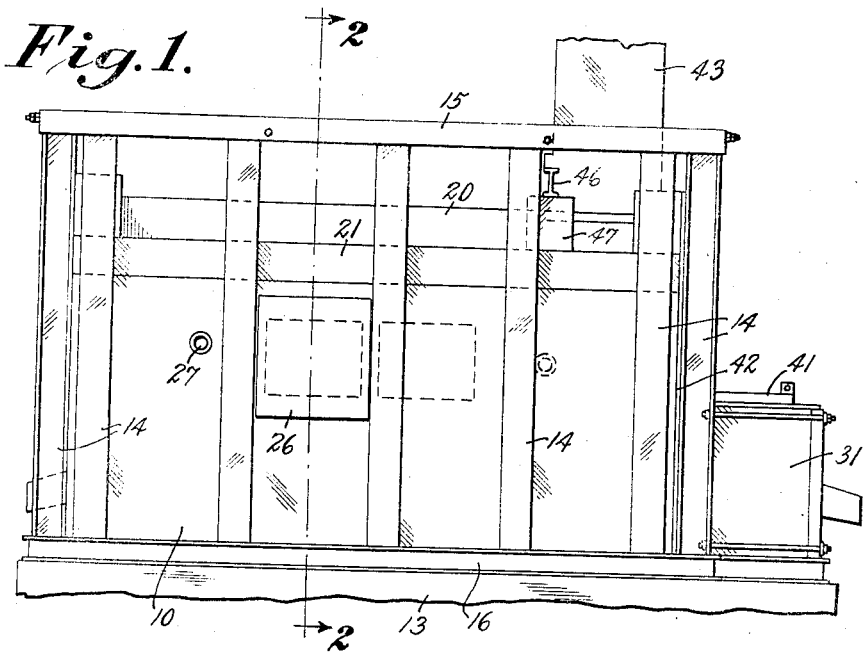
Figure 2:
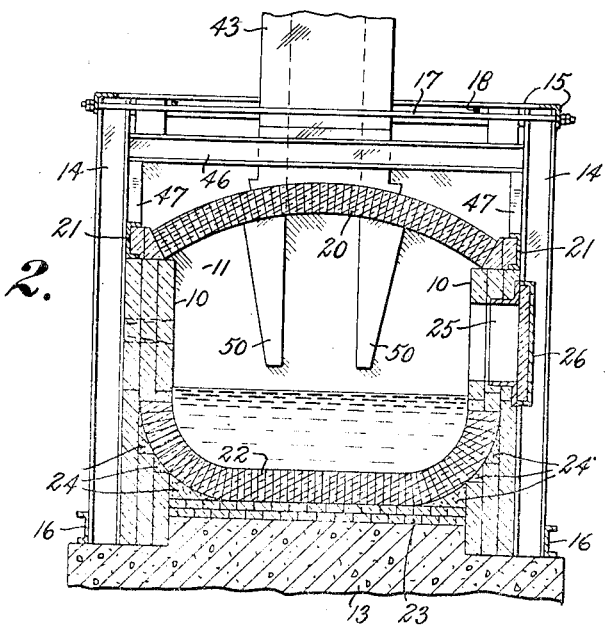
Fig. 2 is a vertical transverse section of the furnace taken on the line 2—2 of Fig. 1.
Figure 3:
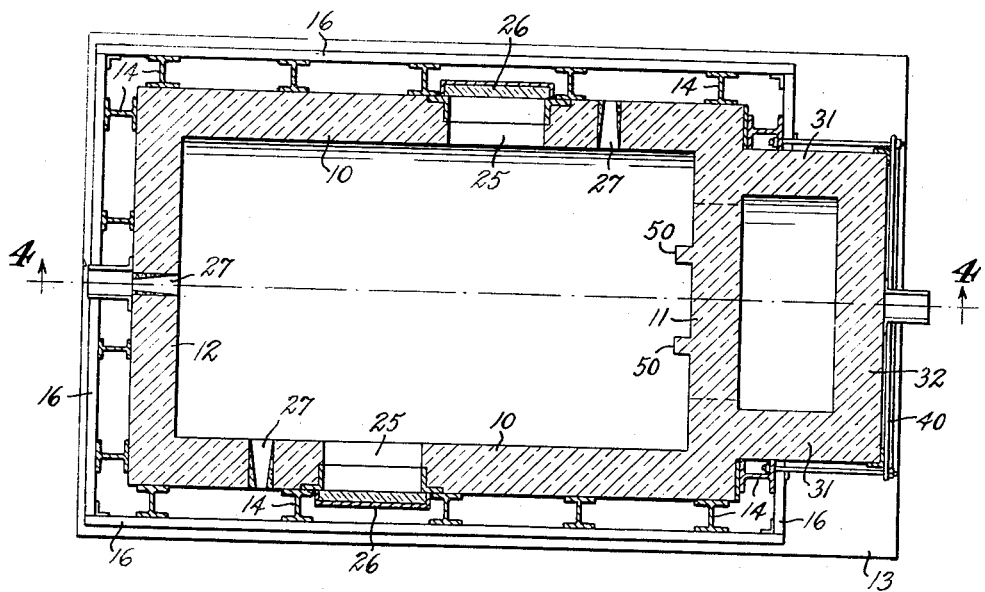
Fig. 3 is a horizontal section taken on the line 3—3 of Fig. 4.
Figure 4:
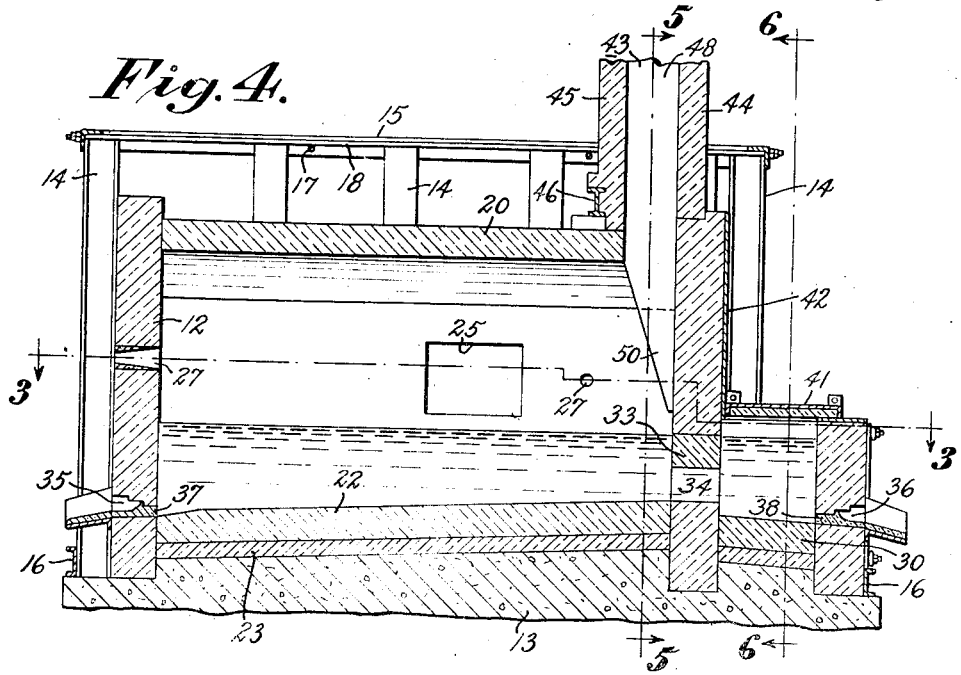
Fig. 4 is a vertical longitudinal section taken on the line 4—4 of Fig. 3.

Referring to the drawings more in detail the furnace is shown as having side walls 10, a front wall 11, and a rear wall 12 which rest upon a base 13 of suitable material such as concrete. The walls 10, 11 and 12 are held in a frame of structural members such as vertical I-beams 14 which rest upon the base 13 and are joined at their ends to upper and lower horizontal frames 15 and 16 respectively. Suitable transverse and longitudinal tie rods 17 and 18 respectively join the sides and ends of the upper horizontal frame 15 for strengthening purposes. A roof 20 may be arched between the side walls 10 in the usual manner. Beams 21 may extend along the tops of the side walls to receive the thrust of the arch and to transmit the same to the vertical I-beams 14.

A hearth 22 having curved or sloping sides is supported between the side walls 10 as by a layer of bricks 23 resting upon the base 13 and by divided refractory material 24 which is readily shaped to the curved sides of the hearth.

The side walls 10 may be provided with charge openings 25 having suitable removable shields or doors 26 of well known form. Openings 27 may also be provided in the side and end walls to receive burners (not shown) by which the charge is heated.

A forehearth 30, having side walls 31 and an end wall 32 is located outside of the front wall 11 which is provided with an arch 33 forming an opening 34 communicating with the forehearth below the normal level of the bath. The forehearth is similar in construction to the main hearth 22 and is supported by the base 13 in a similar manner. The rear wall 12 and the end wall 32 may have discharge openings 35 and 36 respectively, which may be closed by plugs 37 and 38 of, for example, clay. Suitable strengthening members, such as tie rods 40, may be associated with the walls 31 and 32 if desired. The forehearth may be provided with a cover 41 which may be hinged to an end plate 42 mounted adjacent to the front wall 11 and held by the front I-beams 14.

A flue 43 is formed with a front wall 44 supported directly by the front wall 11 and with a rear wall 45 carried by a beam 46 which extends across the furnace and may be carried by supports 47 resting on beams 21. The side walls 48 of the flue 43 are extended downwardly as wings 50 which are built into the front wall 11 of the furnace. The end plate 42 strengthens the end wall 11 against the thrust of the wings 50 and helps support the flue.

In operation the main charge, for example old crankcases and the like, is placed on the hearth 22 through charge openings 25 and heat is applied by burners (not shown) extending through the openings 27. The charge is thus heated and melted to form a bath, the exhaust gases being removed by the flue 43. It is to be understood that any refining or metal recovery operations may be carried out and that the heat may be obtained from any standard source.

The molten bath extends through the opening 34 and fills the forehearth to the same level as the main hearth. The metal on the forehearth is out of contact with the atmosphere of the furnace and is maintained molten by the heat from the main bath within the furnace.

Further quantities of the charge may be supplied through the openings 25 and may be melted in the bath. If the atmosphere of the furnace is highly oxidizing, however, the charge will tend to oxidize before it is incorporated in the bath. Small readily oxidizable particles, such as aluminum turnings and the like, might become oxidized to an undesirable extent if introduced in this manner. Such materials, however, may be introduced directly into the bath on the forehearth, the cover 41 being raised for this purpose, and said materials may be puddled into the bath and melted thereby. The materials are thus kept out of contact with the highly oxidizing atmosphere within the furnace and are incorporated in the bath in condition to be readily melted therein. Obviously, any materials may be introduced to the forehearth if, for example, it is not desired to open the charge doors 26. The molten metal may be withdrawn through discharge openings 35 or 36 and further treated as desired.

The above construction permits the furnace to be used for various types of material and permits the maintenance of a suitable atmosphere within the furnace without interfering with the introduction of a charge which would be affected by such atmosphere. The flue construction within the front wall of the furnace leaves an unobstructed space for the forehearth and affords access thereto for charging and working.

It is obvious that the furnace is capable of a variety of uses and that a specific use has been described as illustrative only. The invention is accordingly to be limited only in accordance with the following claims when interpreted in view of the prior art.

What is claimed is:

1. In combination, a metallurgical furnace having a hearth, roof and side and end walls, a flue mounted within the confines of the furnace, a structural member supported independently of the furnace walls, said flue being supported by said member and by one of said end walls, and side wings built into said last end wall and forming an extension of said flue within said furnace.

2. In combination, a metallurgical furnace having a hearth, roof and side and end walls, a flue mounted within the confines of the furnace, a structural member supported independently of the furnace walls, said flue being supported by said member and by one of said end walls, side wings built into said last end wall and forming an extension of said flue within said furnace, and an end plate located outside of said last end wall to support the same against the thrust of said wings.

3. A metallurgical furnace comprising a hearth, side and end walls, a framework of structural members comprising vertical members spaced around said walls and joined to a horizontal frame, a roof arched between said side walls, beams extending along the sides of said arched roof to transmit the thrust thereof to said framework, a flue, and a beam carried by said framework and supporting said flue independently of said roof.

4. A metallurgical furnace having a roof and an end wall, a structural member, a flue mounted on said member and on said end wall, side wings built in said end wall and forming extensions of said flue, a forehearth located outside of said end wall, said end wall having an opening communicating with said forehearth below the normal level of the bath whereby the bath separates the metal on said forehearth from the atmosphere of the furnace.

5. A metallurgical furnace comprising the combination with a main hearth, roof and side and end walls, of an auxiliary hearth positioned adjacent one of said end walls and communicating with said main hearth through an opening in said end wall below the normal metal line of said furnace and a flue positioned in that end of the furnace adjacent the auxiliary hearth, said flue being carried by said end wall and a structural member supported independently of the side walls of the furnace.

PIERCE BARKER.